United States Patent

Wright

[11] Patent Number: 4,625,408
[45] Date of Patent: Dec. 2, 1986

[54] MEASURING APPARATUS

[75] Inventor: David A. Wright, Edinburgh, Scotland

[73] Assignee: Ferranti plc, Cheshire, England

[21] Appl. No.: 249,953

[22] Filed: Apr. 1, 1981

Related U.S. Application Data

[63] Continuation-in-part of Ser. No. 104,850, Dec. 18, 1979, abandoned.

[30] Foreign Application Priority Data

Dec. 27, 1978 [GB] United Kingdom ............... 7850002

[51] Int. Cl.$^4$ ............................................. G01B 11/03
[52] U.S. Cl. ...................................... 33/1 M; 33/549
[58] Field of Search ................................ 33/1 M, 549

[56] References Cited

U.S. PATENT DOCUMENTS 3,386,174  6/1968  Leach et al. ................... 33/1 M X
3,745,501  7/1973  Wieg ............................. 33/1 M X
4,230,011 10/1950  Battaglia ........................ 33/1 M

FOREIGN PATENT DOCUMENTS 1149176  4/1969  United Kingdom ............... 33/1 M
1186031  4/1970  United Kingdom ............... 33/1 M Primary Examiner—William D. Martin, Jr.
Attorney, Agent, or Firm—Kerkam, Stowell, Kondracki & Clarke

[57] ABSTRACT

Measuring apparatus for determining the position of a point in a measuring volume relative to a datum point at which three mutually perpendicular axes intersect, includes a probe member supported for movement within that volume. Errors due to rotations about the various axes are corrected by providing additional transducers on each axis, there being (n+1) transducers where n is the number of rotations for which correction is required. The embodiments described have three X-axis transducers $X_1$, $X_2$ and $X_3$ and three Y-axis transducers $Y_1$, $Y_2$ and $Y_3$ which, with the appropriate circuitry correct for pitch and yaw errors about the two axes. For the Z-axis only two transducers, $Z_1$ and $Z_2$, are required. The circuit means combines the various transducer outputs to derive corrected values of the three co-ordinates.

9 Claims, 9 Drawing Figures

MEASURING APPARATUS

REFERENCE TO RELATED APPLICATION

This application is a Continuation-in-Part of my application Ser. No. 104,850 filed Dec. 18, 1979 to be abandoned.

MEASURING APPARATUS

This invention relates to measuring apparatus, and in particular to three-dimensional measuring apparatus having automatic correction for rotational errors.

Three-dimensional measuring apparatus may take many forms, but the basic construction of all machines is the same. A suitably supported worktable is provided on which a workpiece to be measured may be mounted. A pair of horizontal guides are fixed relative to the worktable, and support a movable structure. This structure carries a further pair of guides, also horizontal but at right angles to the first set of guides. A movable carriage is mounted on these second guides and carries a probe member which may be moved in a vertical direction. The tip of the probe member is the measuring reference point. Each axis of movement is provided with some means of measuring the movement of the probe tip along the appropriate axis.

Measuring machines vary considerably in size. In a small machine, the first guides carrying the movable structure may be located on one side of the worktable, the structure being cantilevered out over the worktable to give the probe the required range of movement. In a large machine, a "bridge" structure may run on guides located on opposite sides of the worktable, and may support a carriage which moves across the worktable. Other arrangements are also known.

In all machines of this type the probe tip is supported so that it may be positioned at any point within a volume defined by the dimensions of the machine, and this volume will be referred to hereafter as the "measuring volume", since it is only within this volume that measurements may be made.

An example of a small machine is described in U.S. Pat. No. 3,386,174, and many other patents describe measuring machine of all types.

In the simplest form of machine a suitable transducer mounted parallel to each axis is able to determine the position of the probe tip relative to the datum point, which may conveniently be the point at which the axes intersect, or any other suitable location.

There are several possible sources of error if such a simple technique is employed. Lack of straightness in movement and of orthogonality of the axes is one major cause of such errors. A further cause of error is the angular rotation of the carriages about axes perpendicular to their directions of movement. Such errors, often referred to as Abbé errors, depend not only upon rotation but also upon the lateral offset between the probe tip and the transducer measuring in that dimension, and are obviously variable with that offset. Other less serious sources or error exist, such as errors in the linear transducers themselves.

Many attempts have been made to provide correction for the various sources of error referred to. For example it is known to introduce a deliberate and known error into the transducers by various means. However, such corrections only apply for a given location in the measuring volume. An alternative technique is to "calibrate" the machine, measuring the errors existing at various points and storing these so that they may be applied when the machine is actually used. As may be imagined, such a calibration process is extremely lengthy, especially for a large machine, and an enormous amount of storage is necessary. In addition, any "settling" of the machine during use would invalidate the calibrations.

It is an object of the invention to provide measuring apparatus in which some at least of the major errors are automatically corrected.

According to the present invention there is provided measuring apparatus for determining the position of a point in a measuring volume relative to a datum point and with respect to three mutually perpendicular axes, which includes a probe member supported for movement within said measuring volume, such movement being subject to errors caused by rotations about axes perpendicular to one or more of said three axes, a measuring system which includes, for each axis; $(n+1)$ linear position transducers, where n is the number of rotations for which correction is required, the transducers being located outside the measuring volume and spaced from one another so as to detect said rotations, and circuit means operable, for each axis, to combine the outputs of the transducers in such a manner as to provide a single corrected output.

The invention will now be described with reference to the accompanying drawings, in which.

Figure 1:
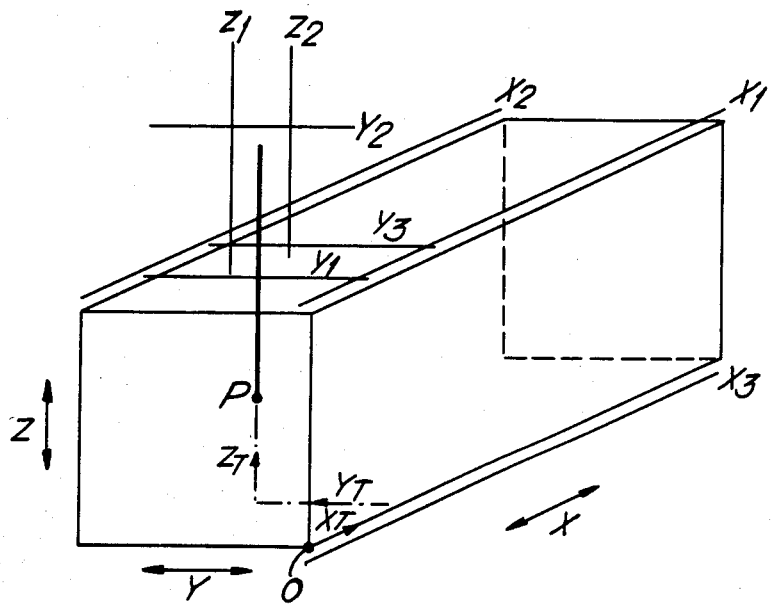
FIG. 1 is a schematic diagram showing a typical arrangement of the transducers.

Referring now to FIG. 1, this illustrates an embodiment of the invention in schematic form. The construction of the measuring machine itself is not shown, as the invention may be applied to so many different forms of machine. However, all machines have the facility to position a probe at any point within a measuring volume, and this is shown as a solid of rectangular cross-section. The probe is shown in heavy line as a vertical member having a tip P representing the point whose position is to be measured relative to an origin O such as that at which the X, Y and Z axes intersect. The three co-ordinates of the probe tip are $X_t$, $Y_t$ and $Z_t$. The main carriage of the machine which moves in the X direction may have pitch and yaw movements, that is rotations about axes parallel to the Y and Z directions respectively. The machine is therefore provided with three transducers each extending in the X direction. Transducer $X_1$ and $X_2$ are located at the top of, or above, the measuring volume, on opposite sides as shown in FIG. 1, and the third transducers $X_3$ is located at the bottom of, or below the measuring volume, at one side thereof.

The second carriage, movable on the main carriage in the Y direction, may also be affected by pitch and yaw movements, these being rotations about axes parallel to the X and Z axes respectively.

Hence again it is necessary to use three transducers to provide the necessary correction. Two transducers, $Y_1$ and $Y_3$ are located on either side of the main carriage so that the second carriage moves between them. It is not possible simply to locate the third transducer below the measuring volume as a workpiece occupying the volume would interfere with the movement of that part of the second carriage which has to co-operate with the transducer. Hence the third transducer $Y_2$ is located above the other two transducers. It must be supported rigidly so as to move with the main carriage of the machine.

Both the X and Y movements might also suffer from errors due to roll, that is a third rotation, about the actual axis of movement. However, the effect of this on the axis concerned is much less than that of the other sources of error.

So far as the Z or vertical axis is concerned, the errors due to movement parallel to the Z axis are not affected in any way be the X and Y co-ordinates of the position of the probe. In this the errors will depend only upon the Z position, and these may be corrected by conventional averaging or weighting techniques. For this two transducers Z, and $Z_2$ are required, these being located in a common plane with the probe axis.

Now that the general arrangement has been described briefly, each axis will be considered in detail, to consider the arrangement of the transducers, and the arrangements necessary to combine the outputs of these transducers to give the correct output.

Figure 2:
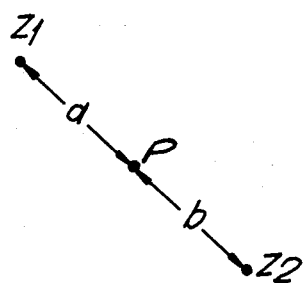
FIG. 2 is a schematic plan view of the Z-axis transducers.

Consider firstly the Z axis. FIG. 2 shows a schematic plan view showing the position of the probe axis P and the two transducers $Z_1$ and $Z_2$. Also shown in FIG. 2 are the distances of the two transducers from the axis of the probe. As already stated, the two transducers and the probe lie in a common vertical plane.

The true Z co-ordinate of the point P is given by the expression $$Z_t = (az_1 + bz_2)/(a+b)$$

where $z_1$ and $z_2$ are the outputs of the transducers $Z_1$ and $Z_2$ respectively.

If, as is easily achieved, a and b are equal, then $$Z_t = (z_1 + z_2)/2$$

It would be possible to use three Z-axis transducers, if $Z_1$ and $Z_2$ could not be co-planar with the probe axis, but this is a very unlikely situation.

Figure 3:
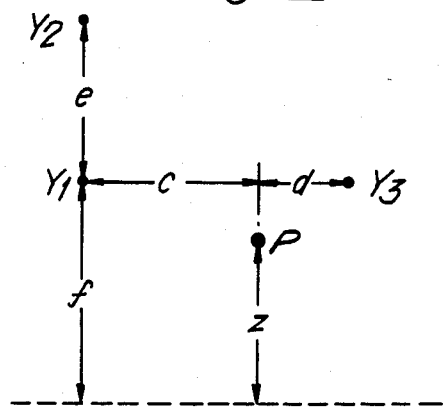
FIG. 3 is a schematic side view of one arrangement of the Y-axis transducers.

The situation concerning the Y axis is more complex since more sources of error exist. Correction due to pitch errors may be corrected by two transducers separated vertically, as are transducers $Y_1$ and $Y_2$. Similarly errors due to yaw may be corrected by two horizontally separated transducers such as $Y_1$ and $Y_3$. FIG. 3 illustrates the arrangement of Y transducers, and is a front view of part of the measuring volume of FIG. 1. The broken line represents the bottom of the measuring volume. It will be seen from FIG. 3 that c and d are fixed distances depending upon the position of the probe axis relative to the two transducers $Y_1$ and $Y_3$. The distances e and f are fixed by the arrangement of the transducers $Y_1$ and $Y_2$. Considering first the correction $Y_Y$ in the Y co-ordinate for yaw error about the Y axis, the necessary correction would be given by $(y_3 - y_1).c/(c+d)$ where $y_3$ and $y_1$ are the outputs of transducers $Y_3$ and Y, respectively. In the simplest case where c=d, this correction is given by $$Y_Y = (y_3 - y_1)/2$$

The Y co-ordinate is also affected by pitch errors. The correction $Y_p$ for the pitch error is given by $$Y_p = -(y_2 - y_1).(f - Z_t)/e$$

Hence the true value of the Y co-ordinate is given by $$Y_t = y_1 + (y_3 - y_1).c/(c+d) - (y_2 - y_1).(f - Z_t)/e$$

In this expression $Z_t$ is the corrected value of the Z co-ordinate. However, the value of either $z_1$ or $z_2$ may be used, since the margin of error is in any case small, and is reduced in the expression given above.

Figure 4:
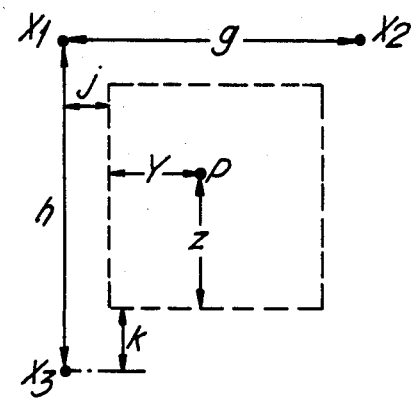
FIG. 4 is a schematic end view of the X-axis transducers.

In the case of the X axis measurement, one possible solution is to use two transducers which are always located in the same horizontal plane as the probe tip. This would require a fairly complex mechanical arrangement which could itself be a source of error. It is possible to use three fixed transducers as shown in FIG. 1. The arrangement is shown in greater detail in FIG. 4 which shows an end view of the measuring volume of FIG. 1. As shown in FIG. 4 two of the transducers are located above the measuring volume and one $X_3$, below it. The various relevant dimensions are shown in FIG. 4, all but the Y and Z co-ordinates being fixed values. As before the Y and Z co-ordinates may be either the corrected values $Y_t$ and $Z_t$ or the values given by one transducer on each axis, say $Y_1$ and $Z_1$. Considering first the correction $X_y$ for the yaw error, this is given by the expression:

$$X_Y = (x_2 - x_1).(j + Y)/g$$

Similarly the correction $X_p$ for pitch error about the X axis is given by $$X_p = (x_3 - x_1).(h - k - Z)/h$$

Hence the true value of the X co-ordinate is given by $$X_t = x_1 + (x_2 - x_1).(j + Y)/g + (x_3 - x_1).(h - k - Z)/h$$

Figure 5:
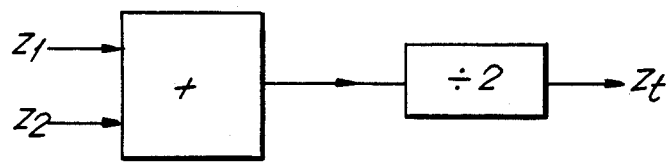
FIG. 5 is a block diagram of Z-axis correction circuitry.

The algorithms given above for the corrected values of the three co-ordinates may be put into effect by either software or hardware. The larger types of machine with which such error correction systems may be used are often associated with computers and the like, in which case it will be easier to use software. Such software would also permit the workpiece datum(s) to be shifted if required. However, some smaller machines may be require the use of hardware. This will comprise basically simple circuitry comprising counters, adders and the like. In the case of the Z-axis for example, it is possible to use a single counter to store the quantity $(z_1 + z_2)$. This quantity only requires division by two to give the required value $Z_t$. A block diagram of such a circuit is shown in FIG. 5. In the case of the Y co-ordinate the circuitry is more complex, though still basically simple. The Y-axis algorithm, as given above, is:

$$Y_t = y_1 + (y_3 - y_1)/2 - (y_2 - y_1).(f - Z_t)/e$$

Three counters are required, one being a full-range counter to store $y_1$, and the other two being difference counters for the values $(y_3-y_1)$ and $(y_2-y_1)$. The value $Z_t$ is obtained from the Z-axis circuitry, whilst e and f are constants. The logic necessary to determine the value of $Y_t$ is thus easily devised, one simple form being shown in block diagram form in FIG. 6.

Figure 6:
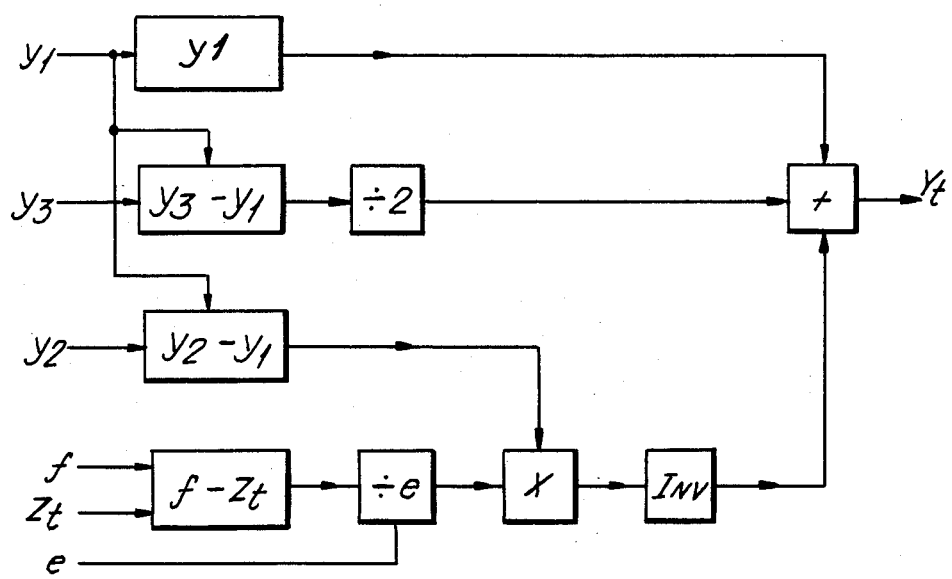
FIG. 6 is a block diagram of Y-axis correction circuitry.

Referring to FIG. 6, as already stated, a full-range counter 10 holds the value of $y_1$, and two shorter-range counters 11 and 12 hold the values $(y_3-y_1)$ and $(y_2-y_1)$ respectively. The output of counter 10 is connected directly to an adder 13. The output of counter 11 passes to a divide-by-2 stage 14 and thence to the adder 13. A fourth counter 15 has as its inputs the constant value f and and $Z_t$ output of the Z-axis stages. The output of this counter is divided by the constant value e in divider 16 and then multiplied by the output of counter 12 in multiplier 17. After sign-changing in stage 18 the quantity is applied to adder 13, the output of which represents the required value $Y_t$.

If the Y-axis algorithm is the more complex version, incorporating the constants c and d, then the circuitry may be modified to incorporate this.

In the case of the X co-ordinate the X-axis algorithm is:

$$X_t=x_1+(x_2-x_1).(j+Y)/g+(x_3-x_1).(h-k-Z)/h$$

Figure 7:
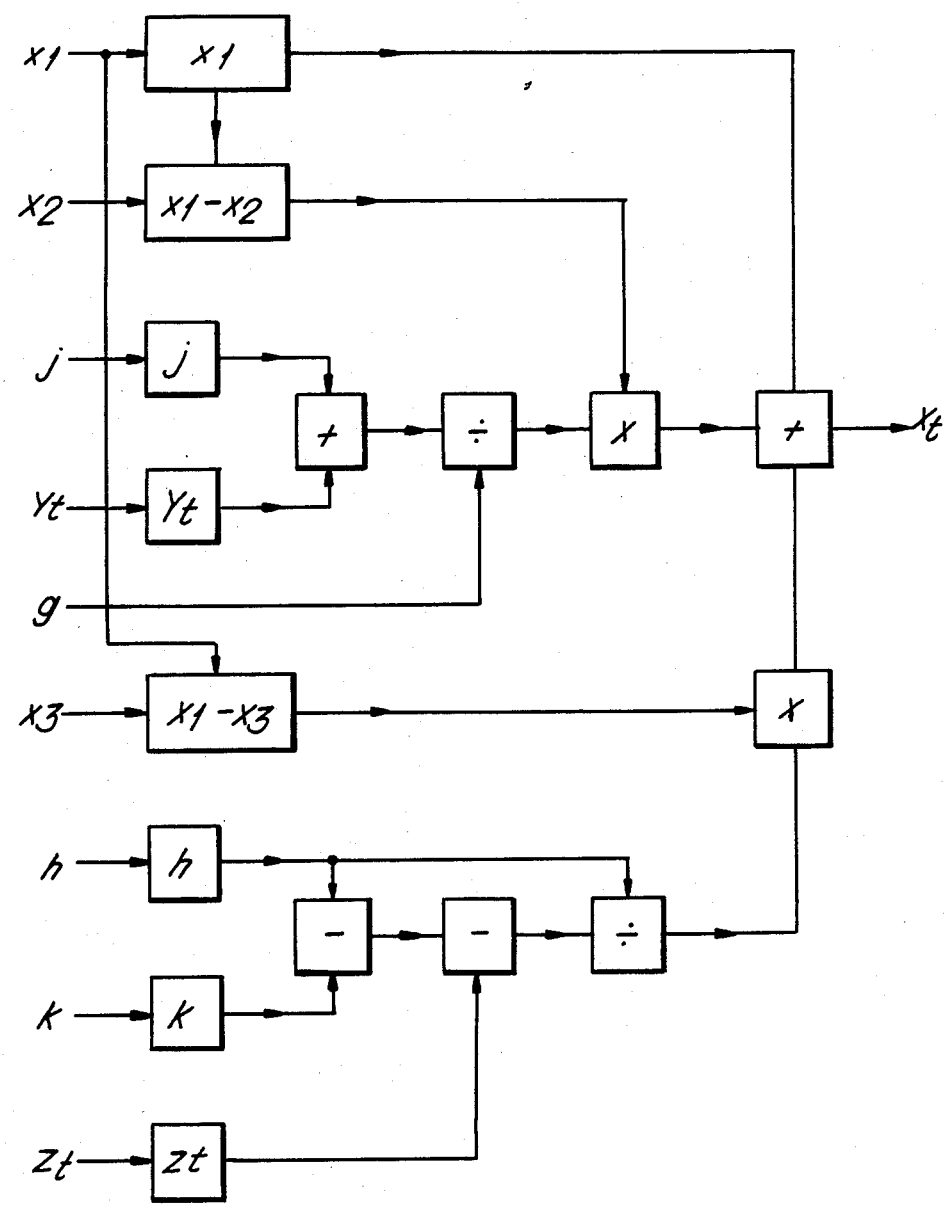
FIG. 7 is a block diagram of X-axis correction circuitry for the embodiment of FIG. 4.

FIG. 7 shows one form of logic necessary to determine the value of $X_t$. The only variable quantities applied to this logic are the various x, Y and Z values, the other inputs being constants. It will be seen, without a detailed explanation, that the logic shown will operate to determine the value of $X_t$.

Figure 8:
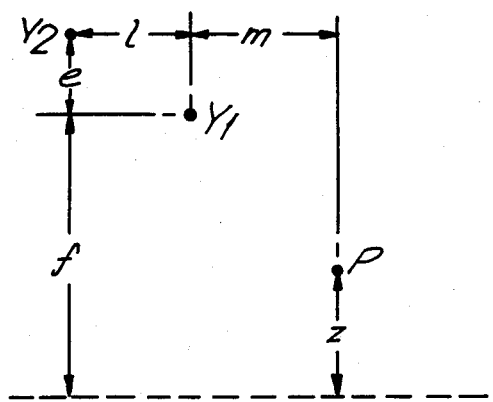
FIG. 8 is a schematic side view of an alternative arrangement of the Y-axis transducers.

It will be appreciated that the description given above relates to one particular arrangement of transducers. For different arrangements it will be necessary to derive different algorithm. By way of example only, FIG. 8 is a schematic end view of an arrangement using only two Y transducers. This arrangement still gives correction for Y pitch errors, but is less satisfactory in correcting for Y yaw errors which are often smaller. The expression for the true value $Y_t$ of the Y co-ordinate is:

$$Y_t=y_1-(y_2-y_1).(f-Z)/3$$

and gives some correction for yaw errors so long as $$0<(f-z)/e<2m/1$$

The yaw correction is also exact when $$(f-Z)/3=m/e$$

that is when P lies on the line joining $Y_1$ and $Y_2$.

In the case of the Z axis, the errors will in general be small, and it may not be necessary to use any additional transducers on this axis.

Figure 9:
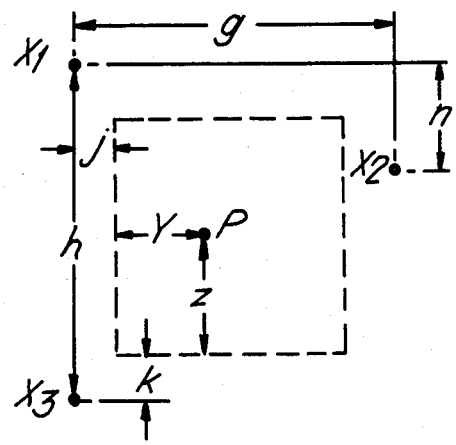
FIG. 9 is a schematic end view of an alternative arrangement of the X-axis transducers.

The X co-ordinate arrangement described above with reference to FIGS. 4 and 7 requires two of the X-axis transducers to be in the same horizontal plane, It may, for various reasons, be difficult to locate the transducers in this way, and FIG. 9 therefore, shows an alternative arrangement in which the $X_1$, and $X_2$ transducers are located in different horizontal planes. The only dimension additional to those shown in FIG. 4 is n, a fixed dimension defining the vertical separation between transducers $X_1$ and $X_2$. As before the transducers $X_1$ and $X_3$ are in the same vertical plane.

The algorithm necessary to determine the value of $X_t$ with this arrangement of transducers is:

$$X_t=x_1+[(x_2-x_1)-(x_3-x_1)n/h](j+Y)/g+(x_3-x_1).(h-k-Z)/h$$

As in the previous embodiments, logic may easily be developed which will solve this algorithm, and determine the required value of $X_t$.

The error-correcting feature will normally be required to function only on demand, and not continuously. This is an advantage when software is being used, though not necessary when hardware such as that described above is available.

As is usual with measuring machines, the error-correcting circuitry will apply its output to a display or to further calculating apparatus which itself derives other parameters.

No mention has so far been made on the form of transducers to be used on each of the three axes. The most convenient form is the Moiré fringe grating, in which a scale member is secured to one part of the machine and a reading head on the other part co-operates with this scale grating. The reading head usually comprises a source of illumination, a short index grating, and a number of light-sensitive detectors.

Associated electrical circuitry, which is well-known, produces outputs in the form of a train of pulses or sine waves in quadrature, the phase relationship indicating the sense of the relative motion between the two parts.

The actual locations of the scales and reading heads will depend upon the lay out of the machine. In the case of the Z-axis it is only necessary to provide a second scale and reading head adjacent to that which is already provided, whilst ensuring that the two scales and the axis of movement of the probe are co-planar.

Possible transducer arrangements for the X and Y Y axes have already been described. In the case of the $X_3$ transducer, located at the bottom of or below the measuring volume, it will be necessary to carry the reading head, in the case of a Moiré fringe transducer, on a rigid arm extending downwards from the main carriage. Similarly, the $Y_2$ transducer will have to be rigidly be secured to the first carriage whilst the reading head is carried by the second carriage. In all instances the transducers should be located as close to the measuring volume as possible.

The error correction arrangements described above will provide a considerable increase in the accuracy of readout, particularly with the larger types of machine. The increase in accuracy will be greater on the X and Y axes since the scope for error is greater.

What we claim is:

1. Measuring apparatus for determining the position of a point in a measuring volume relative to a datum point and with respect to three mutually perpendicular axes, which includes a probe member supported for movement within said measuring volume, such movement being subject to errors caused by rotations about axes perpendicular to one or more of said axes, a measuring system which includes, for each axis, (n+1) linear position transducers when n is the number of rotations for which correction is required, the transducers being located outside the measuring volume and spaced from one another so as to detect said rotations, and circuit means operable, for each axis, to combine the outputs of the transducers in such a manner as to provide a single corrected output.

2. Apparatus as claimed in claim 1 in which a first axis is horizontal and in which the measuring system includes a first transducer located above and to one side of the measuring volume, a second transducer located in the same horizontal plane as the first transducer and spaced therefrom, and a third transducer located in the same vertical plane as one of the first and second transducers and spaced therefrom.

3. Apparatus as claimed in claim 1 in which a first axis is horizontal and in which the measuring system includes first and second transducers located in different horizontal planes and on opposite sides of the measuring volume and a third transducer located in the same vertical plane as one of the first and second transducers and spaced therefrom.

4. Apparatus as claimed in claim 2 in which the first horizontal axis is the X axis and in which the third transducer is located vertically below one of the first and second transducers.

5. Apparatus as claimed in claim 3 in which the first horizontal axis is the X axis and in which the third transducer is located vertically below one of the first and second transducers.

6. Apparatus as claimed in claim 1 in which a second axis is horizontal and in which the measuring system includes a first transducer located above the measuring volume, a second transducer located in the same horizontal plane as the first transducer and spaced therefrom, and a third transducer located in the same vertical plane as one of the first and second transducers and spaced therefrom.

7. Apparatus as claimed in claim 5 in which the second horizontal axis is the Y axis and in which the third transducer is located vertically above one of the first and second transducers.

8. Apparatus as claimed in claim 1 in which a third axis is vertical and in which the measuring system includes first and second transducers located in the same vertical plane as one another and as said third axis.

9. Apparatus as claimed in claim 1 in which each transducer comprises a scale grating and a cooperating reading head arranged to produce and detect Moire fringes.

* * * * *